June 8, 1948.   G. H. POHM   2,442,960
REGULATED RECTIFYING SYSTEM
Filed Aug. 2, 1944
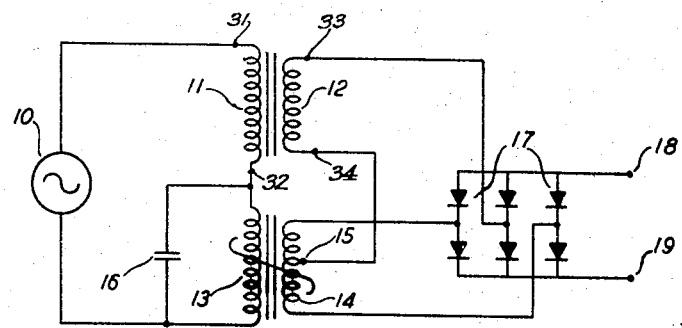
FIG. 1
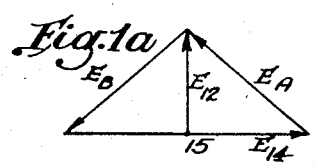
Fig.1a.
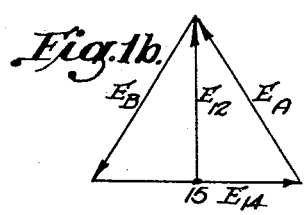
Fig.1b.
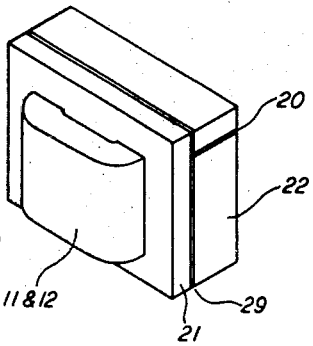
FIG. 2
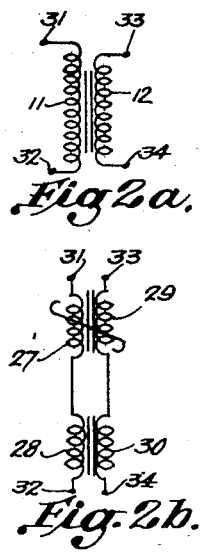
Fig.2a.
Fig.2b.
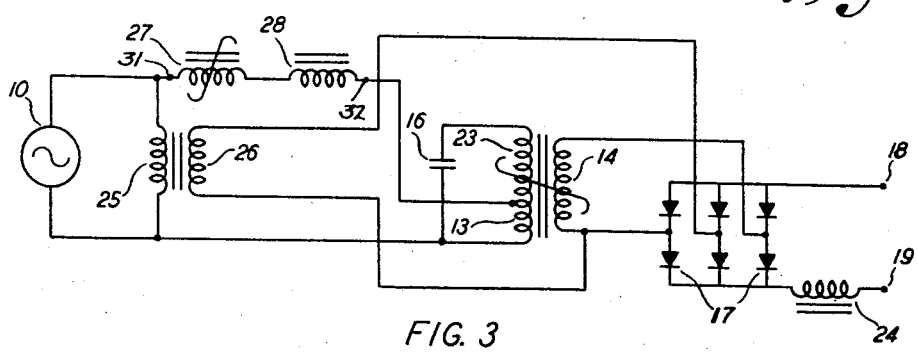
FIG. 3
INVENTOR.
GEORGE H. POHM
BY
ATTORNEYS.

Patented June 8, 1948

2,442,960

UNITED STATES PATENT OFFICE 2,442,960

REGULATED RECTIFYING SYSTEM

George H. Pohm, Lorain, Ohio, assignor, by mesne assignments, to Lorain Products Corporation, Lorain, Ohio, a corporation of Ohio Application August 2, 1944, Serial No. 547,776

11 Claims. (Cl. 175—363)

This invention relates to a regulated rectifying system for supplying constant rectified voltage to a variable load when energized from a variable-voltage source of alternating current.

My invention makes use of a saturable transformer and a condenser in a parallel combination energized from a single-phase source through series inductance. A polyphase rectifier is supplied with voltage from the saturable transformer and the series inductance in one embodiment of my invention, and the phase displacement occurring when the rectifier is loaded causes a change from single-phase rectification under light loads to polyphase rectification under heavy loads to increase the rectified voltage and compensate for voltage drops in the circuit. My invention makes possible accurate compensation of the voltage drops occurring under all values of load current, by providing series impedance means having a plurality of magnetic flux paths of differing characteristics, one being most effective under light loads and another under heavy loads so that the load compensation may be accurately controlled for both light and heavy loads.

An object of my invention is to supply a constant rectified voltage to a variable load from a variable voltage source of alternating current.

Another object of my invention is to energize a rectifier through magnetic controlling means for accurately compensating for changes both in load current and supply voltage, to provide compensated rectified voltage.

Still another object of my invention is to produce an inductance element having a plurality of magnetic flux paths of different characteristics and to utilize the inductance in the rectifying arrangement to provide accurate control of the rectified voltage.

A further object of my invention is to produce a controlled phase displacement in a rectifier supply system and to utilize the phase displacement in the production of polyphase rectification.

Other objects and a better understanding of my invention may be obtained by referring to the following specification and claims together with the accompanying drawings.

Figure 1 shows an arrangement for producing regulated rectification through the use of a phase-shifting regulating combination together with a three-phase rectifier.

Figures 1a and 1b are vector diagrams of voltages in the circuit of Figure 1.

Figure 2 shows a core construction applicable to one of the impedance elements of Figure 1.

Figure 2a shows schematically the windings of Figure 2 and may be interchanged with the corresponding impedance means of Figure 3.

Figure 2b shows an impedance means equivalent to that of Figure 2a, and interchangeable with Figure 2a which is a part of Figure 1, and Figure 3 shows a circuit utilizing the arrangement shown in Figure 2b but with the secondary windings omitted since their function is carried out by a separate transformer.

With more particular reference to Figure 1, there is shown a saturable transformer or inductance having a primary winding 13 connected in parallel with a capacitor 16 and energized from an alternating current source 10 through a series impedance winding 11. A polyphase rectifier bridge 17 is energized from the saturable transformer secondary winding 14 and from secondary winding 12 on the series impedance element. As increasing load is drawn from the output terminals 18 and 19, the phase relationship between the voltages induced in windings 12 and 14 changes and voltage across winding 12 increases. The phase shift and magnitude change is utilized to obtain polyphase rectificattion under heavy loads.

It is well known that polyphase rectification produces a higher rectified voltage for a given energizing voltage than does single-phase rectification. In particular, balanced three-phase full-wave rectification produces a rectified voltage approaching the crest value of the applied voltage; various degrees of unbalance in the energizing voltage produce proportionate reductions in the rectified voltage.

In Figure 1, under certain load conditions, the phase displacement between the voltages in windings 12 and 14 may approach ninety degrees, the tap 15 may be centrally located on winding 14 and winding 12 may be proportioned to produce a substantially balanced three-phase voltage at the input terminals of the rectifier 17. Lighter loading will then produce an unbalanced polyphase voltage and tend to reduce the rectified voltage. The circuit constants may be proportioned to utilize this change in the rectification to compensate for the change in voltage drop through the rectifier and other circuit elements under changing load and at the same time to compensate for the variations in source voltage.

The vector diagrams representative of light load and full load conditions are shown in Figures 1a and 1b, respectively. In these figures, $E_{14}$, the voltage across winding 14, is used as the reference voltage. The tap 15 divides $E_{14}$ as indicated. Winding 12 is connected to tap 15 so the vector $E_{12}$ representing the voltage across winding 12 is drawn upward from the point 15. The voltages applied to the rectifiers 17 are then $E_{14}$, $E_A$ and $E_B$.

Figure 1a represents the light load condition in which the voltage $E_{12}$ is relatively small, resulting in an unbalanced polyphase rectification.

As the load increases, $E_{12}$ shifts its phase somewhat and increases its magnitude until the condition of Figure 1b is reached in which the voltages $E_{14}$, $E_A$ and $E_B$ represent a substantially balanced three-phase system as mentioned above.

The optimum compensation may not require a close approach to balanced polyphase rectification under any load condition; the tap 15 may not be centrally located on winding 14, it may in fact coincide with an end terminal of the winding, and the winding 12 may have considerably less induced voltage than winding 14, but the regulation is nevertheless obtained by a variation of the degree of unbalance of the polyphase rectification as described. The description has referred to a balanced three-phase system merely for the sake of clarity and ease of explanation.

A preferred method of construction for the impedance element having windings 11 and 12 in Figure 1 is shown in Figure 2. The laminations making up the core are divided into two sections 21 and 22 which may be separated from each other by a non-magnetic spacer 29 to reduce the interchange of flux between the two sections.

The section 21 may be made with a substantially closed magnetic flux path by interleaving the laminations, or it may have a small non-magnetic gap in its magnetic circuit. Under low magnetizing forces the section 21 has a lower reluctance than section 22. Section 22 is provided with a non-magnetic gap 20 and under higher magnetizing forces appreciable flux may be driven across this gap, while the section 21 may become saturated. This method of construction provides individual control of the magnetization characteristics of the impedance winding 11 at low and at high magnetizing forces. I have found that the magnetization characteristic of impedance winding 11 at low magnetization is important in determining the voltage compensation obtained under light loads while the voltage under heavier loads may be more dependent on the impedance characteristics under stronger magnetization. I am therefore able to provide optimum voltage compensation for both light and heavy loads and at the same time to produce accurate compensation for variations in the voltage of source 10 by means of the arrangement shown.

For even finer control of the voltage compensation, more than two core sections may be provided, each section having slightly different characteristics. It is not necessary that one of the sections comprise a substantially closed path, since the exact character of the sections is determined by the circuit constants and design requirements.

Modifications of the construction shown in Figure 2 may be utilized for the same purpose. The different sections of laminations comprise parallel magnetic flux paths of differing characteristics; these flux paths might be provided by individual core members magnetically in parallel or by other equivalent arrangements without departing from the principles of my invention.

Figure 2a shows schematically the windings 11 and 12 on the core structure shown in Figure 2. Figure 2b shows schematically an equivalent winding arrangement which utilizes two individual cores to replace the core of Figure 2.

The arrangements shown in Figures 2a and 2b both comprise inductive impedance means having a plurality of magnetic flux paths of differing characteristics, and may be used interchangeably.

The terminals 31, 32, 33 and 34 in Figures 2a and 2b are equivalent to the terminals having these numbers in Figures 1 and 3 to show the interchangeability of the structures of Figures 2a and 2b.

Specifically, Figure 2a is a portion of Figure 1, and since Figure 2b is equivalent to Figure 2a, the portion of Figure 1 indicated by the terminals 31, 32, 33 and 34 may be replaced by Figure 2b.

Although Figures 1, 2a, and 2b show transformers having insulated secondary windings, it is apparent that auto-transformers might be used instead of those shown if insulation of the rectified voltage were not required.

In the circuit of Figure 3 the impedance element 11 of Figure 2 is replaced by two series impedances 27 and 28. Secondary winding 26 in Figure 3 replaces secondary winding 12 in Figure 1.

The impedance 27, indicated as a saturable inductance in Figure 3, may have a substantially closed magnetic flux path or it may be provided with a small air gap, but in operation it has non-linear impedance characteristic which takes the place of the core section 21 in Figure 2.

Impedance 28 is preferably provided with an air gap and takes the place of the core section 22 in Figure 2.

A transformer is shown in Figure 3 having a primary winding 25 connected directly to source 10 and energizing a secondary winding 26 which is connected on one end to the secondary winding 14 and on the other end to the rectifier 17.

In this manner the rectifier is supplied with a voltage which, under normal loading, is displaced in phase from the voltage across secondary winding 14. In order to provide the equivalent of the winding combination of Figure 1, both of the series impedances 27 and 28 in Figure 3 would be provided with secondary windings 29 and 30 as shown in Figure 2b. The winding 26 of Figure 3, being a single winding, may be preferred to the two secondary windings 29 and 30 on the series elements 27 and 28, but, on the other hand, providing both 27 and 28 with secondary windings produces added flexibility which is realized by the individual adjustment of the turn ratios on both units. The added flexibility may be utilized to provide optimum voltage compensation for a greater number of load conditions.

The impedance element 11 in Figure 2a may be connected between the terminals 31 and 32 of Figure 3 to replace the elements of Figure 2b which are shown in Figure 3. Since winding 26 replaces winding 12, the terminals 33 and 34 would not be used in either case.

Winding 23 in Figure 3 is added to the saturable transformer primary winding 13 to increase the voltage on capacitor 16 in order to make use of a smaller capacitor.

The operation of the circuit shown in Figure 3 follows the same principles described in connection with Figure 1. The voltage across winding 26 is substantially in phase with and proportional to the source voltage, while the voltage across winding 14 shifts in phase with the application of load and, to a smaller degree, with the variation of input voltage. The transformer saturation cooperates in producing the shift in phase across winding 14 with variations of source voltage and of load and stabilizes the magnitude and phase relationships in the circuit to vary the degree of unbalance of the polyphase rectification in response to load and source variations. The degree of unbalance in turn controls the rectified output voltage.

Filter inductance 24 serves to reduce the ripple in the rectified voltage supplied from terminals 18 and 19. Because of the polyphase rectification the ripple voltage is relatively small and easily smoothed out. Additional filtering means, both capacitive and inductive, may be added when the single inductance 24 does not provide sufficient filtering.

It is apparent that the various modifications shown and described may be used interchangeably for the most part or combined as desired without departing from the principles of my invention.

Although I have described my invention with a certain degree of particularity it is understood that numerous changes in the details of construction and the combination and arrangement of parts may be resorted to without departing from the spirit and scope of the invention as hereinafter claimed.

I claim as my invention:

1. A rectifying system comprising first and second inductive impedance means connected in series and adapted to be energized from an alternating current source, said first impedance means having a plurality of magnetic flux paths of differing characteristics, a capacitor substantially in parallel with the second impedance means, said second impedance means having a saturable magnetic core, a polyphase rectifier, circuit means coupled to said impedance means and connected to said rectifier for supplying polyphase voltages thereto.

2. A rectifying system comprising first and second inductive impedance means connected in series and adapted to be energized from an alternating current source, said first impedance means having a plurality of magnetic flux paths of differing characteristics, a capacitor substantially in parallel with the second impedance means, said second impedance means having a saturable magnetic core, a polyphase rectifier, circuit means coupled to said impedance means and to said source, and connected to said rectifier for supplying polyphase voltages thereto.

3. A rectifying system comprising first and second inductive impedance means connected in series and adapted to be energized from an alternating current source, said first impedance means having a plurality of magnetic flux paths of differing characteristics, a capacitor substantially in parallel with the second impedance means, said second impedance means having a saturable magnetic core, a polyphase rectifier, circuit means coupled to said first and second impedance means, and connected to said rectifier for supplying polyphase voltages thereto.

4. A rectifying system comprising first and second non-linear inductances connected in series and adapted to be energized from an alternating current source, a winding on the second inductance, a capacitor connected in a closed circuit including said winding, a transformer connected across said source, a polyphase rectifier, and circuit means adapted to supply polyphase voltages to said rectifier from said transformer and said second inductance.

5. In combination, a first inductance having a magnetic core comprising a plurality of parallel magnetic flux paths at least one of the paths having a non-magnetic gap therein, a second inductance having a saturable magnetic core, a capacitor connected in a closed circuit including a winding on the second inductance, first circuit means for connecting said first and second inductances in series with each other and with a source of alternating current, a polyphase rectifier, and second circuit means for supplying said rectifier with voltage from said source and from at least one of said inductances.

6. In combination, a first inductance having a magnetic core comprising a plurality of parallel magnetic flux paths at least one of the paths having a non-magnetic gap therein, a second inductance having a saturable magnetic core, a capacitor connected in a closed circuit including a winding on the second inductance, first circuit means for connecting said first and second inductances in series with each other and with a source of alternating current, a polyphase rectifier, and second circuit means for supplying said rectifier with voltage from said first and second inductances.

7. A rectifying system comprising in combination a saturable transformer adapted to be energized from an alternating current source through a plurality of series inductances having differing magnetization characteristics, a capacitor substantially in parallel with said transformer, and a polyphase rectifier adapted to be energized with voltage from said transformer and from said source.

8. A rectifying system comprising in combination a saturable transformer adapted to be energized from an alternating current source through a plurality of series inductances having differing magnetization characteristics, a capacitor substantially in parallel with said transformer, and a polyphase rectifier adapted to be energized with voltage from said transformer and at least one of said inductances.

9. A rectifying system comprising first and second inductances connected in a series circuit adapted to be connected to an alternating current source, said second inductance having a saturable magnetic core, a winding on the second inductance, a capacitor connected in a closed circuit including said winding, a transformer adapted to be connected to said source, a polyphase rectifier, and circuit means adapted to supply polyphase voltages to said rectifier from said second inductance and said transformer.

10. A rectifying system comprising first and second inductive impedance means connected in series and adapted to be energized from an alternating current source, said first impedance means having a plurality of magnetic flux paths of differing characteristics, a capacitor substantially in parallel with the second impedance means, said second impedance means having a saturable magnetic core, a transformer connected across said source, a polyphase rectifier, circuit means coupled to said transformer and said impedance means and connected to said rectifier for supplying polyphase voltages thereto.

11. A rectifying system comprising first and second inductive impedance means connected in series and adapted to be energized from an alternating current source, a transformer connected across said source, a capacitor substantially in parallel with the second impedance means, a polyphase rectifier, circuit means coupled to said second impedance means and to said transformer, and connected to said rectifier for supplying polyphase voltages thereto.

GEORGE H. POHM.

(References on following page)

REFERENCES CITED

The following references are of record in the file of this patent:

UNITED STATES PATENTS

| Number | Name | Date |
|---|---|---|
| 1,731,861 | McRell | Oct. 15, 1932 |
| 1,863,936 | Schwager | June 21, 1932 |
| 2,209,948 | Harmer | Aug. 6, 1940 |
| 2,364,558 | Stocker | Dec. 5, 1944 |

FOREIGN PATENTS

| Number | Country | Date |
|---|---|---|
| 546,976 | Great Britain | Aug. 7, 1942 |